United States Patent

Ambrose

[15] 3,696,546

[45] Oct. 10, 1972

[54] FISH ALARM AND CIRCUIT CONTINUITY TESTER

[72] Inventor: Henry B. Ambrose, 3722 Forecastle Ave., West Covina, Calif. 91790

[22] Filed: March 8, 1971

[21] Appl. No.: 121,745

[52] U.S. Cl. .................. 43/17, 340/214, 340/283
[51] Int. Cl. ........................................... A01k 97/12
[58] Field of Search ............ 43/17, 16; 340/214, 283

[56] References Cited

UNITED STATES PATENTS

| | | |
|---|---|---|
| 2,196,784 | 4/1940 | Simmons et al. .............43/17 |
| 3,188,767 | 6/1965 | Finefield......................43/17 |
| 3,440,754 | 4/1969 | Slama et al. ..................43/17 |

FOREIGN PATENTS OR APPLICATIONS

| | | |
|---|---|---|
| 966,140 | 8/1964 | Great Britain................43/17 |

*Primary Examiner*—Samuel Koren
*Assistant Examiner*—Daniel J. Leach
*Attorney*—Boniard I. Brown

[57] ABSTRACT

An alarm device adapted for use as a circuit continuity tester and a fish strike alarm for attachment to a flexible fishing rod. The alarm device has a battery housing with means for attaching the housing to a fishing rod, a probe extending from the housing having an electrical contact at its outer end, a clamp to be attached to the fishing rod opposite the outer probe end and having an electrical contact engageable with the probe contact upon deflection of the rod by a fish strike, and an alarm circuit which is activated by engagement of the contacts. The probe is adjustable to vary the fishing rod deflection required to engage the contacts and actuate the alarm circuit. The alarm circuit has a terminal in parallel with the probe for electrical connection to an auxiliary contact element, such as a second clamp, to adapt the alarm device for use as a circuit continuity tester.

11 Claims, 6 Drawing Figures

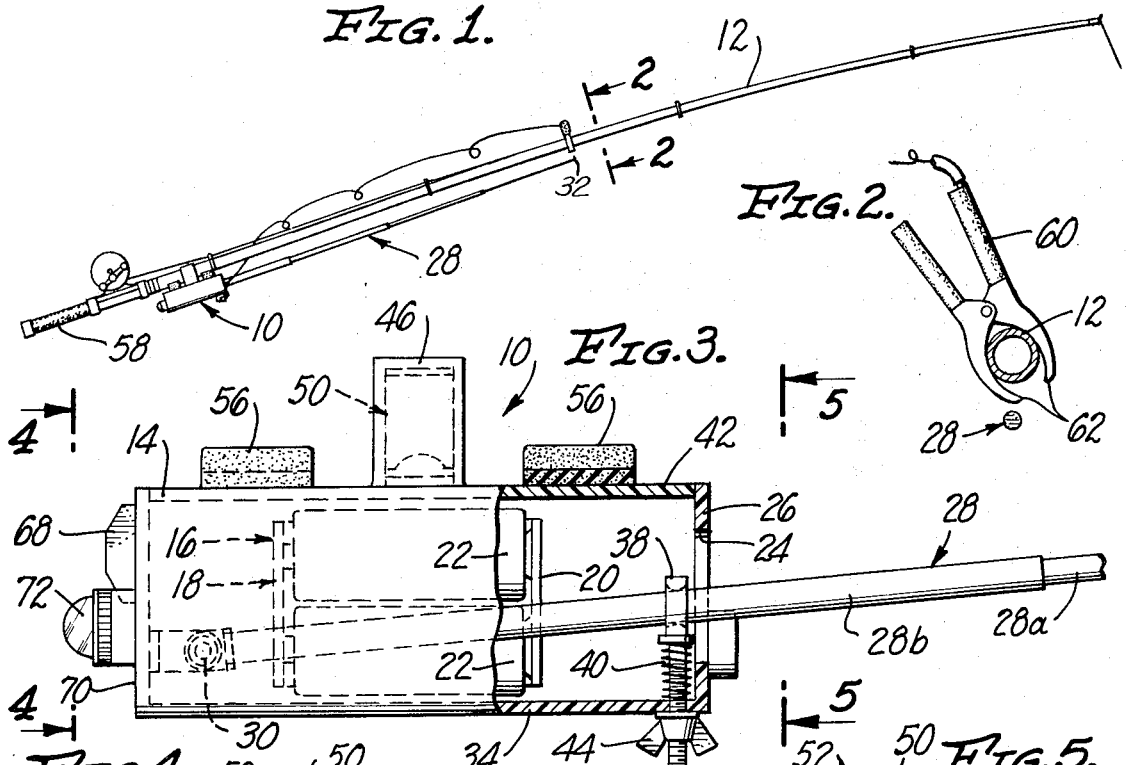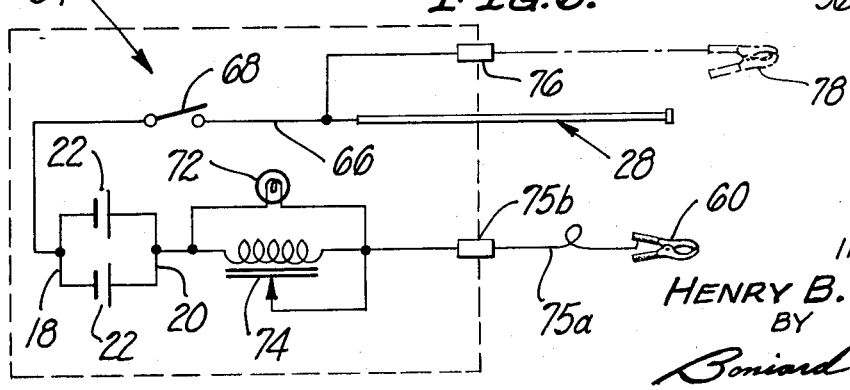
INVENTOR
HENRY B. AMBROSE
BY
Boniard I. Brown
ATTORNEY

FISH ALARM AND CIRCUIT CONTINUITY TESTER

1. Field of the Invention electrical

This invention relates generally to electrical alarm devices and more particularly to such a device which is usable as a fish strike alarm for a fishing rod and a circuit continuity tester.

2. Discussion of the Prior Art

The alarm device of the invention is a dual purpose device which may be attached to a fishing rod to signal a fish strike and which may also be used as a continuity tester for checking the electrical continuity of electrical circuits. The primary use of the device, however, is fish strike alarm, so that the device will be described primarily in connection with this use.

The prior art is replete with a vast assortment of fish strike alarms. Examples of such alarms are found in Patent Nos. 463,794 (Canadian); 3,188,767; 3,283,437 and 3,359,672. The existing alarms of this kind have certain disadvantages which this invention overcomes. Foremost among these disadvantages are complexity, cost, inability of attachment to conventional fishing rods, and inability of adjustment of the fish strike force required to activate the alarm. Also, the existing fish strike alarms are limited to such use.

SUMMARY OF THE INVENTION

The alarm device of the present invention has a battery housing with means for attaching the housing to a conventional flexible fishing rod. Extending from the housing is a probe which may comprise telescoping sections that may be telescoped for convenience of storage of the alarm device. On the outer end of the probe is an electrical contact forming part of an alarm circuit. This alarm circuit includes a clamp for attachment to the fishing rod opposite the outer end of the probe. The probe and clamp have electrical contacts which engage to activate the alarm circuit upon deflection of the fishing rod by a fish strike. The probe is adjustable to vary the spacing between the probe and clamp contacts and thereby the fishing rod deflection required to activate the alarm circuit.

The alarm circuit has an electrical terminal in parallel with the probe for electrical connection to an auxiliary contact element, such as a second clamp contact. This auxiliary contact element is connected to the alarm device to adapt the latter for use as a continuity tester for electrical circuits. In this latter use, the fish strike alarm probe is telescoped and the auxiliary contact element is connected to the parallel terminal of the alarm circuit to permit circuit continuity testing by applying the clamp contact and auxiliary contact element to selected points of the circuit to be tested.

BRIEF DESCRIPTION OF THE DRAWINGS

FIG. 1 illustrates the present alarm device mounted on a fishing rod;

FIG. 2 is an enlarged section taken on line 2—2 in FIG. 1;

FIG. 3 is an enlarged side elevation of the device, partly in section;

FIG. 4 is a view on line 4—4 in FIG. 3;

FIG. 5 is a view on line 5—5 in FIG. 3; and

FIG. 6 illustrates the alarm circuit of the device.

DESCRIPTION OF THE PREFERRED EMBODIMENT

FIGS. 1-5 illustrate an alarm device 10 according to the invention mounted on a fishing rod 12 for use as a fish bite or strike alarm. The alarm device has a battery housing 14 containing a battery holder 16 with contacts 18 and 20 for engaging the end terminals of dry cells 22. Extending from the housing, through a slot 24 in one end wall 26 of the housing, is a metal probe 28. The inner end of the probe is pivotally attached at 30 to the housing for pivotal adjustment of the probe in the plane of the housing slot 24. The outer end of the probe provides an electrical contact 32. Probe 28 has telescoping sections 28a, 28b. The outer section 28a may be telescoped into the inner section 28b for convenience of storage.

Extending through one side wall 34 of the housing 14 is a screw 36 having an inner apertured head 38 through which the probe 28 extends. Surrounding the screw is a compression spring 40 which urges the probe toward the opposite housing side wall 42. A wing nut 44 on the screw is rotatable in one direction to swing the probe against the thrust of the spring and in the other direction to release the probe for swinging in the opposite direction by the spring. Thus, the probe is pivotally adjustable relative to the housing.

Projecting from the housing side wall 42 midway between the ends of the housing are a pair of flat hollow lugs 46 having cavities 48 which open inwardly toward one another. Fixed to the wall 42 between the lugs is a spring 50 which is bent to provide a pair of generally loop shaped resilient gripping arms 52 which project into the lug cavities. These arms define therebetween an opening 54 for receiving the fishing rod 12, as explained below. Fixed to the housing wall 42 at opposite sides of the lugs 46 and spring 50 are resilient pads 56.

Spring arms 52 and pads 56 provide means for attaching the battery housing 14 to the fishing rod 12. This attachment is accomplished by snapping the rod into the space 54 between the spring arms to a position wherein the rod seats against the housing pads 56. In this regard, it will be understood that the spring arms are spaced and sized to yieldably grip the rod with sufficient force to hold the battery housing in place on the rod. The housing is installed on the rod just above its handle 58 with the probe 28 extending outwardly along the rod toward its tip.

The alarm device includes a second electrical contact element in the form of a clamp 60 which is adapted to be attached to the rod 14, as shown. The ends of the clamp arms 62 provide an electrical contact. Clamp 60 is installed on the rod opposite the end of the probe 28 in position such that the probe and clamp contacts 32, 62 engage upon deflection of the rod in response to a fish bite or strike. The probe is pivotally adjustable by rotation of the wing nut 44 to vary the spacing between the contacts and thereby the rod deflection and hence the fish bite or strike force required to engage the contacts.

The contacts 32, 62 form part of an alarm circuit 64 which is activated by engagement of the contacts. This alarm circuit includes a lead 66 connecting the probe 28 to the battery contact 18 through the on-off switch 68 on the housing end wall 70 facing the rod handle 58. The contact clamp 60 is connected to one terminal of an indicator lamp 72 and alarm buzzer 74 by a lead 75a with a plug which fits in a socket 75b on the housing 14. The lamp and buzzer terminals are connected to the battery contact 20. Lamp 72 is mounted in the housing end wall 70. The alarm buzzer 74 is mounted within the housing.

It will now be understood that the probe and clamp contacts 32, 62 are normally spaced so that the lamp 72 and buzzer 74 are normally deenergized. Deflection of the fishing rod 14 in response to a fish bite engages the contacts to energize the lamp and buzzer and thereby signal that a bite has occurred. As noted earlier, the probe 28 is adjustable to vary the force on the fish line required to activate the alarm circuit.

The alarm device is also designed for use as a circuit continuity tester. To this end, the alarm circuit 64 includes a terminal 76, such as a socket, which is connected in parallel with the probe 28. This terminal is adapted for electrical connection to an auxiliary contact element 78, such as a clamp, which may be used in connection with the contact clamp 60 to check a circuit by applying the clamp to selected points of the circuit. If the test circuit is intact between these points, the alarm circuit 64 is activated.

What is claimed as new in support of Letters Patent is:

1. A fish strike alarm for flexible fishing rod comprising:
   a battery housing;
   a battery holder in said housing including electrical contacts for engaging the terminals of batteries positioned in said holder;
   a probe extending from said housing having an electrical contact at its outer end;
   means for attaching said housing to said fishing rod in a manner such that said probe extends along said rod;
   a clamp for attachment to said rod opposite said probe contact and including an electrical contact for engaging said probe contact upon deflection of said rod in response to a fish strike; and
   an alarm circuit including said contacts adapted to be activated by engagement of said probe and clamp contacts.

2. An alarm according to claim 1 including:
   means for adjusting the spacing between said probe and clamp contacts and thereby the fishing rod deflection required to effect engagement of said probe and clamp contacts.

3. An alarm according to claim 1 including:
   means for adjusting said probe to adjust the spacing between said probe and clamp contacts and thereby the fishing rod deflection required to effect engagement of said probe and clamp contacts.

4. An alarm according to claim 1 wherein:
   the opposite end of said probe extends through a slot in one end of said housing, and
   said alarm includes means pivotally attaching said opposite probe end to said housing, and means for pivotally adjusting said probe to adjust the spacing between said probe and clamp contacts and thereby the fishing rod deflection required to effect engagement of said probe and clamp contacts.

5. An alarm according to claim 4 wherein:
   said probe adjusting means comprises a spring for urging said probe in one direction about its pivot axis, and means for adjusting said probe in the opposite direction about its pivot axis.

6. An alarm according to claim 1 wherein:
   said probe comprises telescoping sections which may be telescoped for storage.

7. An alarm according to claim 1 wherein:
   said housing attachment means comprises a spring clamp between the housing ends for gripping the fishing rod, and a pair of pads at opposite sides of the housing for seating against said rod.

8. An alarm according to claim 1 wherein:
   said alarm circuit includes an on-off switch and an alarm lamp at the outside of said housing and an alarm buzzer within said housing.

9. An alarm according to claim 1 wherein:
   said housing attachment means comprises a spring clamp between the housing ends for gripping the fishing rod, and a pair of pads at opposite sides of the housing for seating against said rod;
   one end of said housing when attached to said fishing rod faces the tip of said rod and the other end of said housing faces the fishing rod handle;
   the opposite end of said probe extends through a slot in said one end of said housing;
   said alarm includes means pivotally attaching said opposite probe end to said housing, and means for pivotally adjusting said probe to adjust the spacing between said probe and clamp contacts and thereby the fishing rod deflection required to effect engagement of said probe and clamp contacts;
   said probe adjusting means comprises a spring for urging said probe in one direction about its pivot axis, and means for adjusting said probe in the opposite direction about its pivot axis;
   said probe comprises telescoping sections which may be telescoped for storage; and
   said alarm circuit includes an on-off switch and an alarm lamp at said other end of said housing and an alarm buzzer within said housing.

10. An alarm according to claim 9 wherein:
    said probe is metallic and said opposite probe end is electrically connected to one battery contact and said alarm circuit includes a wire electrically connecting said clamp contact to the other battery contact.

11. An alarm according to claim 1 wherein:
    said alarm circuit includes a terminal in parallel with said probe for electrical connection to an electrical connection to an electrical contact device to be used in conjunction with said clamp for adapting said alarm for use as a circuit continuity tester.

* * * * *